United States Patent
Hesselmann et al.

(10) Patent No.: US 10,516,317 B2
(45) Date of Patent: Dec. 24, 2019

(54) MOTOR BEARING ARRANGEMENT FOR A MOTOR, IN PARTICULAR OF A FAN OF A VEHICLE AIR-CONDITIONING UNIT

(71) Applicant: VALEO KLIMASYSTEME GMBH, Bad Rodach (DE)

(72) Inventors: Alexander Hesselmann, Coburg (DE); Ralph Ströhla, Coburg (DE); Siefried Derx, Lichtenfels (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 566 days.

(21) Appl. No.: 15/306,517

(22) PCT Filed: Apr. 16, 2015

(86) PCT No.: PCT/EP2015/058293
§ 371 (c)(1),
(2) Date: Oct. 25, 2016

(87) PCT Pub. No.: WO2015/162056
PCT Pub. Date: Oct. 29, 2015

(65) Prior Publication Data
US 2017/0047812 A1    Feb. 16, 2017

(30) Foreign Application Priority Data
Apr. 25, 2014   (DE) .................. 10 2014 105 876

(51) Int. Cl.
*H02K 5/24*    (2006.01)
*H02K 7/08*    (2006.01)
*F04D 25/08*   (2006.01)
*F04D 29/66*   (2006.01)
*F04D 29/056*  (2006.01)

(52) U.S. Cl.
CPC ............... *H02K 7/08* (2013.01); *F04D 25/08* (2013.01); *F04D 29/056* (2013.01); *F04D 29/668* (2013.01); *H02K 5/24* (2013.01)

(58) Field of Classification Search
CPC .......................... F04D 25/08–082; H02K 5/24
See application file for complete search history.

(56) References Cited

FOREIGN PATENT DOCUMENTS

| DE | 605 203 C1 | 11/1934 |
|----|------------|---------|
| DE | 10 2006 061582 A1 | 7/2008 |
| EP | 0 736 954 A1 | 10/1996 |
| FR | 1 521 494 A | 4/1968 |

OTHER PUBLICATIONS

International Search Report issued in corresponding application No. PCT/EP2015/058293 dated Aug. 4, 2015 (3 pages).
Written Opinion of the International Searching Authority issued in corresponding application No. PCT/EP2015/058293 dated Aug. 4, 2015 (5 pages).

*Primary Examiner* — Ramon M Barrera
(74) *Attorney, Agent, or Firm* — Osha Liang LLP

(57) ABSTRACT

A motor bearing arrangement for a motor (22) of a fan (20) of a vehicle air-conditioning unit has a frame (16), a support (26) which partially overlaps the frame (16) at least in a connecting region, and multiple damping elements (36) which are provided between the frame (16) and the support (26) in the connecting region, wherein the support (26) is held on the frame (16) by means of the damping elements (36).

15 Claims, 2 Drawing Sheets

Figure 1:
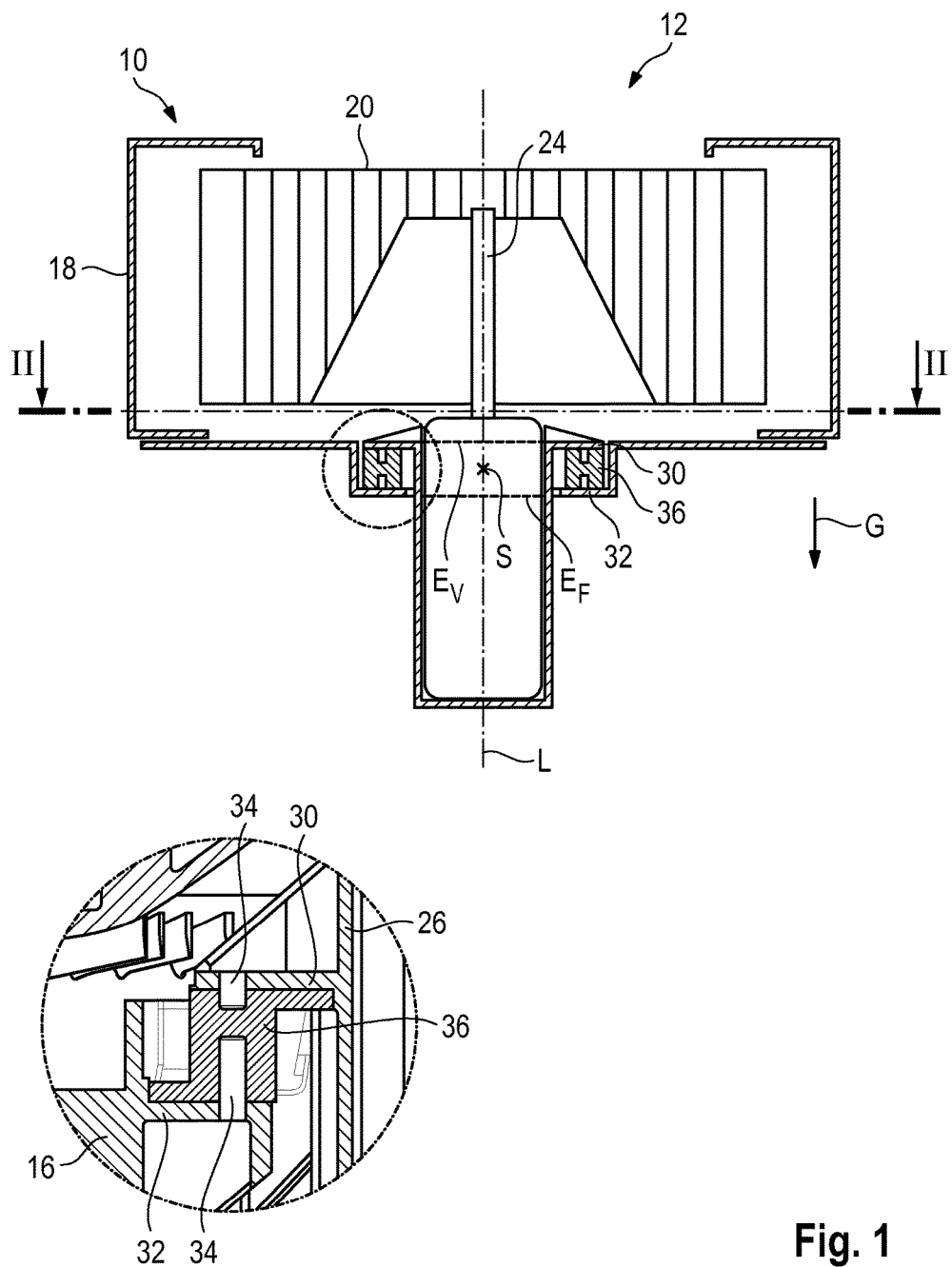

MOTOR BEARING ARRANGEMENT FOR A MOTOR, IN PARTICULAR OF A FAN OF A VEHICLE AIR-CONDITIONING UNIT

The invention relates to a motor bearing arrangement for a motor, in particular a motor of a fan of a vehicle air-conditioning unit.

Vehicle air-conditioning units serve for the air conditioning of the vehicle interior compartment. They may be in the form of heating units, ventilation units or air conditioners.

Motor bearing arrangements for motors of a fan for vehicle air-conditioning units must be designed so as to permit adequately stable mounting of the motor together with the fan such that the fan does not impact against housing parts. For this purpose, it is necessary for the motor to be mounted in the most rigid and motionless manner possible.

At the same time, however, the motor bearing arrangement also serves for dampening the vibrations generated by the motor, for example owing to imbalances. As far as possible, said vibrations should not be transmitted to the housing of the vehicle air-conditioning unit or to other components that are fixedly connected to the vehicle body, as such vibrations lead to disturbing noise generation. In particular, the transmission of relatively high-order, for example $12^{th}$ order, high-frequency vibrations of the motor is undesirable.

For the mounting of the motor, a multiplicity of solutions are known which predominantly make use of an annular damping element which is provided between motor and housing. These however have a large contact surface, which promotes the transmission of vibrations. At the same time, they are subjected to load by shear and tensile stresses, which cause rapid aging of the damping material.

It is an object of the invention to provide a motor bearing arrangement which, in a simple and permanently reliable manner, ensures stable and quiet mounting of the motor, together with fan, of a vehicle air-conditioning unit.

The object is achieved by means of a motor bearing arrangement for a motor, in particular for a motor of a fan of a vehicle air-conditioning unit, having a frame, having a support which partially overlaps the frame at least in a connecting region, and having multiple damping elements which are provided between the frame and the support in the connecting region, wherein the support is held on the frame by means of the damping elements. Through the use of multiple damping elements, the contact surface between the support and the frame can be reduced, whereby the transmission of vibrations, in particular relatively high-order vibrations, to the frame is prevented in an effective manner. In this way, it is possible to realize very quiet mounting of the motor. Furthermore, owing to the multiplicity of damping elements, improved mechanical fixing of the motor, and thus greater stability of the fan, are realized.

For example, the support is of cylindrical form, wherein the frame surrounds the circumference of the cross section of the support and the damping elements are arranged along the circumference of the support so as to be spaced apart from one another in the circumferential direction, such that the weight of the support together with the motor and the fan is distributed over the circumference of the support.

The support is preferably substantially of circular cylindrical form, such that simple installation of the support into the frame is made possible.

In one refinement of the invention, the damping elements are arranged rotationally symmetrically, in particular point-symmetrically, about an axis through their common centre of gravity or about the common centre of gravity, whereby a uniform distribution of the forces on the damping elements along the circumference of the support is made possible.

In one design variant, a motor with a motor shaft is arranged on the support, wherein the motor shaft runs through the common centre of gravity of the damping elements, and in particular said motor shaft constitutes the axis of symmetry of the damping elements. In this way, a particularly uniform distribution of the weight of the motor between all of the damping elements is ensured, which contributes to the stability of the motor and of the fan and to low levels of noise generation by the motor bearing arrangement.

It is preferably provided that projections extend outward from the support and flange sections extend inward from the frame, which flange sections overlap the projections in an axial direction, wherein the damping elements are provided in each case axially between a projection and the flange section that overlaps the projection. In this case, "overlap in an axial direction" is to be understood to mean that, viewed along the longitudinal axis of the support, the projections are at least partially concealed by the flange sections or vice versa. Owing to the design of the projections and flange sections, it is possible for the damping elements to be mounted in a targeted and secure fashion.

It is preferably the case that the common centre of gravity of the motor and the fan lies between a plane formed from the projections and a plane formed from the flange sections; in particular, the common centre of gravity lies on the axis of symmetry of the damping elements. In this way, tilting of the fan in the event of shocks being exerted on the housing, such as is common while the vehicle is in motion, is prevented in an effective manner.

The projections and/or the flange sections may have at least one tooth which extends in the direction of the overlapping flange section and/or projection, wherein the at least one tooth extends into the damping element, in particular is completely surrounded by the damping element. In this case, "completely surrounded by the damping element" is to be understood to mean that the damping element surrounds the tooth on all sides with the exception of the side that makes contact with the projection/the flange section. By means of the teeth, the freedom of movement of the motor with regard to movements or rotations can be further restricted.

In one embodiment of the invention, the damping elements have a Shore hardness of between 15 and 50 Shore A, in particular between 20 and 40 Shore A, whereby the absorption of relatively high-frequency vibrations is made possible in a reliable manner.

The damping elements may be produced from a thermoplastic elastomer, in particular Allruna®, whereby the damping characteristics of the damping elements are further improved.

In one design variant, the ratio of the thickness of the damping element in the radial direction to the height of the damping elements in the axial direction lies between 0.5 and 2, in particular between 0.6 and 1.2, whereby movements or rotations of the motor in the event of imbalances are prevented. In this case, the statements "radial direction", "axial direction" and "circumferential direction" relate, here and below, to the longitudinal axis of the support.

The ratio of the width of the damping elements in the circumferential direction to the height of the damping elements in the axial direction preferably lies between 0.8 and 3, in particular between 1 and 1.4 in order to prevent a rotation of the motor in the event of an increase or decrease in motor speed.

In one refinement of the invention, between the damping elements, there is provided at least one elastic seal, in particular a rubber lip, which is in contact either with the support or with the housing, whereby the motor bearing arrangement is sealed off without the formation of a bridge which could transmit the vibrations.

The elastic seal preferably has ribs which extend in particular transversely with respect to the extent of the seal, such that high rigidity of the seal is attained.

In one design variant, in the installed position of the motor bearing arrangement, the support lies on the frame via the damping elements, such that the damping elements are subjected only to compressive load by the weight of the motor together with the fan. The damping elements are not subjected to load by tension or shear stresses, such that rapid aging of the damping elements is prevented.

Figure 2:
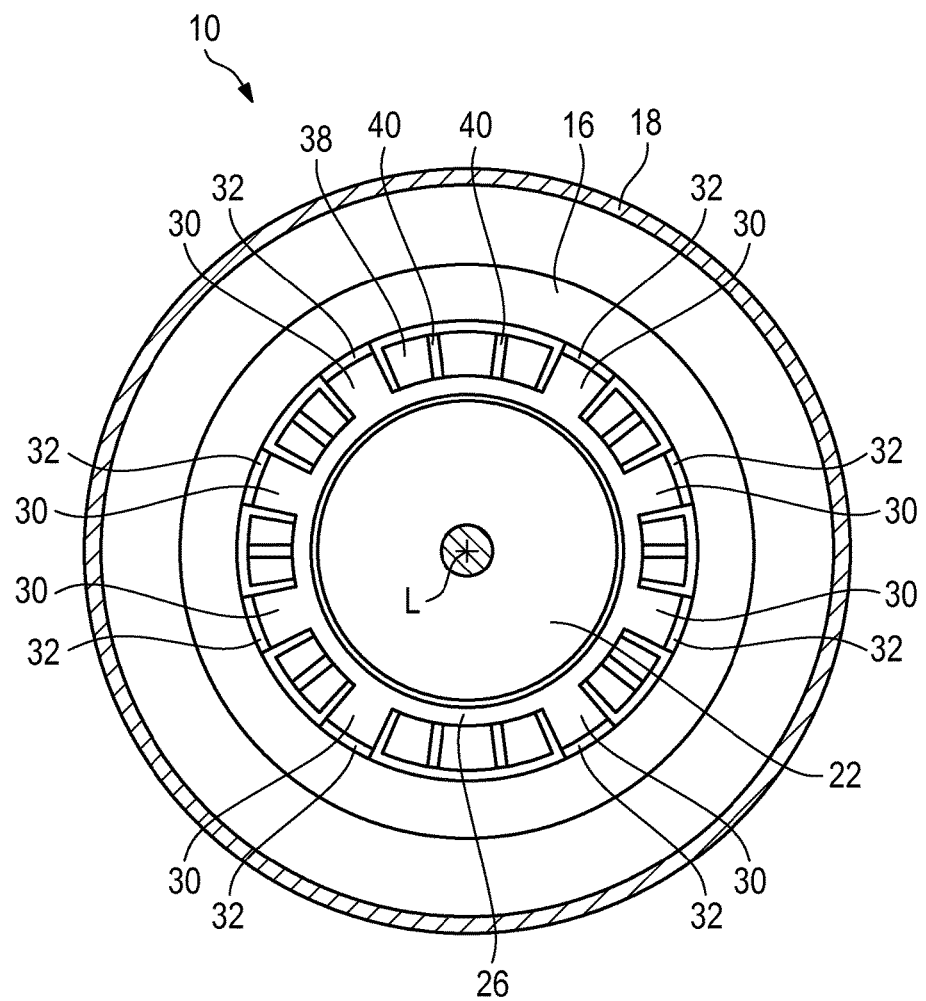

Further features and advantages of the invention will emerge from the following description and from the appended drawings, to which reference is made. In the drawings:

FIG. 1 shows a motor bearing arrangement according to the invention in longitudinal section, and FIG. 2 shows the motor bearing arrangement according to the invention as per FIG. 1 in cross section along the axis II-II.

FIG. 1 illustrates, in section, a motor bearing arrangement 10 which has a blower 12 and a housing 14. The illustrated orientation of the motor bearing arrangement 10 corresponds to its installed position in the vehicle, wherein the arrow points in the direction of gravitational force, that is to say toward the ground.

The housing 14 has a frame 16 and a cover 18 which is fastened to the frame 16.

A recess, which is for example circular, is formed in the frame 16.

Furthermore, the blower 12 has a fan 20, which is provided within the housing 14, and a motor 22 with a motor shaft 24.

The motor shaft 24 is connected to the fan 20, such that said fan can be driven by the motor 22.

The motor 22 is held in a support 26 which extends through the recess of the frame 16.

The support 26 is of cylindrical, for example circular cylindrical, form, and has a longitudinal axis L. Below, where reference is made to the axial, radial and/or circumferential direction, this is in relation to said longitudinal axis L.

The region in the radial direction between the edge of the recess of the frame 16 and the support 26 may be regarded as a connecting region.

As can be seen in FIG. 2, projections 30 are provided on the support 26 along the circumference of the cross section of the support 26, which projections 30 extend radially outward.

The projections 30 are arranged along the circumference of the support 26 so as to be spaced apart from one another in the circumferential direction, and are provided for example on that end of the support 26 which is situated in the housing 14.

Flange sections 32 are provided on the frame 16 so as to be spaced apart axially from the projections 30. The flange sections 32 extend radially inward from the frame 16 from the edge of the recess.

As can be seen in FIG. 2, as viewed in the axial direction, the projections 30 overlap the flange sections 32, that is to say the projections 30 at least partially conceal the flange sections 32 in the view as per FIG. 2.

In each case one projection 30 overlaps one flange section 32, such that projection 30 and flange section 32 are thus assigned to one another.

From each of the projections 30 and/or the flange sections 32, at least one tooth 34 may extend in the axial direction toward the associated flange section 32 or projection 30.

The tooth 34 is for example of pin-like form with a rectangular cross section, wherein more complex shapes and cross sections are self-evidently also conceivable aside from the pin shape.

With reference to the illustration in FIG. 1, the teeth 34 of the projections 30 extend downward in the axial direction, and those of the flange sections 32 extend upward in the axial direction.

Between each of the projections 30 and the respectively overlapping flange section 32 there is provided a damping element 36 by which the support 26 is connected to the frame 16.

In this case, the teeth 34 may extend into the respective damping element 36, or the free sides of said teeth are completely surrounded by the respective damping element 36.

Like the projections 30 and the flange sections 32, the damping elements 36 are arranged along the circumference of the support 26 so as to be spaced apart in the circumferential direction.

For example, the damping elements 36 are arranged rotationally symmetrically about an axis through their common centre of gravity. It is also possible for said axis to correspond to the longitudinal axis L of the support 26 and/or the axis of rotation of the motor shaft 24.

It is likewise conceivable for the damping elements 36 to be arranged point-symmetrically about their common centre of gravity.

In the embodiment shown, the damping elements are arranged both point-symmetrically and rotationally symmetrically about the longitudinal axis L with an angle of symmetry of 180°.

The damping elements 36 may be produced from a thermoplastic elastomer, for example from Allruna®.

They may have a Shore hardness of between 15 and 50 Shore A, in particular between 20 and 40 Shore A.

For example, the damping elements 36 are of substantially rectangular form, wherein, below, the thickness T is considered to be the extent of said damping elements in the radial direction, the height H is considered to be the extent of said damping elements in the axial direction, and the width W is considered to be the extent of said damping elements in the circumferential direction.

The ratio of the width W to the height H, that is to say width divided by height W/H, of the damping elements 36 may lie between 0.8 and 3, in particular between 1 and 1.4.

Also, the ratio of the thickness T to height H, that is to say thickness divided by height T/H, may lie between 0.5 and 2, in particular between 0.6 and 1.2.

Elastic seals 38, in particular rubber lips, are provided between the damping elements 36 in the circumferential direction, which seals close the intermediate space between the edge of the recess of the frame 16 and the support 26, that is to say parts of the connecting region.

The seals 38 may be fastened to the support 26 and do not make contact with the frame 16. It is self-evidently also possible for the seals 38 to be attached to the frame 16, but in this case, said seals do not make contact with the support 26. This prevents the formation of a further connection, aside from the damping elements 36, between the frame 16 and the support 26.

The elastic seals 38 may furthermore have ribs 40 which stiffen the seals 38. For example, the ribs 40 are arranged in the transverse direction of the seals 38, and thus form transverse ribs.

During the operation of the blower 12 and thus of the motor 22, generation of noise in the interior compartment owing to vibrations of the vehicle air-conditioning unit is prevented by means of the arrangement of the motor 22 as described below.

The motor 22 is fastened to the frame 16 by means of the support 26 and the damping elements 36.

In this case, the common centre of gravity S of the motor 22 and fan 20 lies between a plane $E_V$ defined by the projections and a plane $E_F$ defined by the flange sections.

In this case, the common centre of gravity of the damping elements 36 may correspond to the centre of gravity S of the blower 12, that is to say to the common centre of gravity S of the motor 22 together with the motor shaft 24 and of the fan 20.

Furthermore, the motor shaft 24 may be arranged such that it runs through the common centre of gravity of the damping elements 36 and/or constitutes the axis of symmetry of the damping elements 36.

Furthermore, in the installed position of the motor bearing arrangement 10, that is to say in the position relative to the force of gravity in which the motor bearing arrangement 10 is installed in the vehicle, the support 26 lies on the damping element 36. The damping elements in turn lie on the frame 16.

By means of such an arrangement and bearing arrangement of the motor 22, a transmission of vibrations to the frame 16 and thus to components fixedly connected to the vehicle body is prevented. In particular, high-frequency vibrations which correspond to the high harmonic vibrations of the motor 22 are dampened in an effective manner owing to the contact surface by which the support 26 lies on the damping elements 36 being dimensioned to be as small as possible.

The small contact surface arises from the fact that the damping elements 36 are provided so as to be spaced apart from one another in the circumferential direction.

The damping is further improved through the suitable selection of the material of the damping elements 36.

The symmetrical arrangement of the damping elements 36 and the arrangement of the centre of gravity S of the blower 12 serve for realizing optimum mechanical fixing of the motor. Thus, imbalances generated by the motor 22 do not cause the fan 20 to impact against the cover 18 or against other parts of the housing 14.

The geometries of the damping elements 36 also serve for improving stability.

Owing to the arrangement of the common centre of gravity S, the damping elements 36 are subjected only to compressive load, such that they are protected against rapid aging.

By means of the seals 38, the necessary sealing of the blower 12 with respect to the environment is ensured, as an elevated pressure is generated in the housing 14 by the fan 20. Nevertheless, owing to the fact that the seals 38 are connected either to the frame 16 or to the support 26, no vibrations that would lead to the generation of noise can be transmitted via said seals to parts that are connected fixedly to the vehicle body.

The invention claimed is:

1. A motor bearing arrangement for a fan motor of a vehicle air-conditioning unit, comprising:
    a housing that comprises a frame, the frame having a support which partially overlaps the frame at least in a connecting region; and
    multiple damping elements which are provided between the frame and the support in the connecting region, wherein the support is held on the frame by the damping elements,
    wherein projections extend outward from the support and flange sections extend inward from the frame, wherein flange sections overlap the projections in an axial direction, wherein the damping elements are provided in each case axially between a projection and the flange section that overlaps the projection, and
    wherein the projections and the flange sections have at least one tooth which extends in the direction of the overlapping flange section and/or projection, wherein the at least one tooth extends into the damping element and is completely surrounded by the damping element.

2. The motor bearing arrangement according to claim 1, wherein the support is of cylindrical design, wherein the frame surrounds the circumference of the cross section of the support and the damping elements are arranged along the circumference of the support so as to be spaced apart from one another in the circumferential direction.

3. The motor bearing arrangement according to claim 1, wherein the support is of substantially circular cylindrical form.

4. The motor bearing arrangement according to claim 1, wherein the damping elements are arranged point-symmetrically, about an axis through or about the common centre of gravity.

5. The motor bearing arrangement according to claim 4, wherein a motor with a motor shaft is arranged on the support, wherein the motor shaft runs through the common centre of gravity of the damping elements, and constitutes the axis of symmetry of the damping elements.

6. The motor bearing arrangement according to claim 1, wherein the centre of gravity of the motor and of the fan lies between a plane formed from the projections and a plane formed from the flange sections.

7. The motor bearing arrangement according to claim 1, wherein the damping elements have a Shore hardness of between 20 and 40 Shore A.

8. The motor bearing arrangement according to claim 1, wherein the damping elements are produced from a thermoplastic elastomer.

9. The motor bearing arrangement according to claim 1, wherein the ratio of the thickness of the damping elements in the radial direction to the height of the damping elements in the axial direction lies between 0.6 and 1.2.

10. The motor bearing arrangement according to claim 1, wherein the ratio of the width of the damping elements in the circumferential direction to the height of the damping elements in the axial direction lies between 1 and 1.4.

11. The motor bearing arrangement according to claim 1, wherein, between the damping elements, there is provided at least one elastic seal in the form of a rubber lip, which is in contact either with the support or with the housing.

12. The motor bearing arrangement according to claim 11, wherein the elastic seal has ribs which extend transversely with respect to the extent of the seal.

13. The motor bearing arrangement according to claim 1, wherein, in the installed position of the motor bearing arrangement, the support lies on the frame via the damping elements.

14. A motor of a fan of a vehicle air-conditioning unit, comprising:
a motor bearing arrangement,
wherein the motor bearing arrangement comprises:
a housing that comprises a frame, the frame having a support which partially overlaps the frame at least in a connecting region; and
multiple damping elements which are provided between the frame and the support in the connecting region, wherein the support is held on the frame by the damping elements,
wherein projections extend outward from the support and flange sections extend inward from the frame, wherein flange sections overlap the projections in an axial direction, wherein the damping elements are provided in each case axially between a projection and the flange section that overlaps the projection, and
wherein the projections and the flange sections have at least one tooth which extends in the direction of the overlapping flange section and/or projection, wherein the at least one tooth extends into the damping element and is completely surrounded by the damping element.

15. A vehicle air-conditioning unit, comprising:
a fan driven by a motor,
wherein the motor comprises a motor bearing arrangement,
wherein the motor bearing arrangement comprises:
a housing that comprises a frame, the frame having a support which partially overlaps the frame at least in a connecting region; and
multiple damping elements which are provided between the frame and the support in the connecting region, wherein the support is held on the frame by the damping elements,
wherein projections extend outward from the support and flange sections extend inward from the frame, wherein flange sections overlap the projections in an axial direction, wherein the damping elements are provided in each case axially between a projection and the flange section that overlaps the projection, and
wherein the projections and the flange sections have at least one tooth which extends in the direction of the overlapping flange section and/or projection, wherein the at least one tooth extends into the damping element and is completely surrounded by the damping element.

* * * * *